United States Patent [19]

Eck et al.

[11] Patent Number: 5,063,087
[45] Date of Patent: Nov. 5, 1991

[54] PROCESS FOR STRENGTHENING THE ADHESION OF POLYMERIC SUBSTANCES TO CARBONATE SURFACES

[75] Inventors: Herbert Eck, Burghausen; Gerald Fleischmann, Emmerting; Höhl Horst, Munich; Helmut Weber, Ebersberg, all of Fed. Rep. of Germany

[73] Assignee: Wacker-Chemie GmbH, Munich, Fed. Rep. of Germany

[21] Appl. No.: 501,109

[22] Filed: Mar. 29, 1990

[30] Foreign Application Priority Data

May 5, 1989 [DE] Fed. Rep. of Germany ....... 3914874

[51] Int. Cl.$^5$ .............................................. B05D 3/10
[52] U.S. Cl. .................................... 427/302; 427/136; 427/299; 427/393.6; 427/407.1
[58] Field of Search ............... 427/302, 294, 393.6, 427/407.1, 444, 136

[56] References Cited

U.S. PATENT DOCUMENTS

| 3,382,083 | 5/1968 | Marsden | 106/98 |
| 3,767,432 | 10/1973 | Thomas | 65/901 |
| 4,133,938 | 1/1979 | Bingham | 427/302 |
| 4,600,657 | 7/1986 | Wegehaupt et al. | 428/447 |
| 4,874,638 | 10/1989 | Eck et al. | 427/222 |

FOREIGN PATENT DOCUMENTS 0246651 11/1987 European Pat. Off. .
1424529 2/1976 United Kingdom .
1604360 11/1977 United Kingdom .

*Primary Examiner*—Janyce Bell

[57] ABSTRACT

The invention relates to a process for strengthening the adhesion of polymeric substances which contain organic groups or are made up of such groups, or substances containing organic groups which can be crosslinked to form polymers, to surfaces containing an inorganic carbonate, preferably alkaline earth metal carbonates, which comprises applying a solution of a phosphorus compound to the surface containing an inorganic carbonate, in which the phosphorus compound is a phosphorus acid or a phosphorus-containing organosilicon compound having at least one group of the formula $$RSiOP=O,$$

in which R is an SiC-bonded, monovalent, substituted or unsubstituted hydrocarbon radical, and the solvent is an aprotic organic solvent, removing the solvent and thereafter applying the polymeric substance or substance which can be crosslinked to form a polymer to the surface containing the inorganic carbonate.

28 Claims, No Drawings

PROCESS FOR STRENGTHENING THE ADHESION OF POLYMERIC SUBSTANCES TO CARBONATE SURFACES

The present invention relates to carbonate surfaces which are coated with polymeric substances and more particularly to a process for improving the adhesion of polymeric substances to carbonate surfaces.

BACKGROUND OF THE INVENTION

Processes for improving the adhesion of polymeric substances, containing organic groups, to surfaces containing alkaline earth metal carbonates are described in British Patent No. 1,424,529 (issued on Feb. 11, 1976, Dynamit Nobel Aktiengesellschaft) in which a solution of phosphorus-containing organosilicon compound is applied to a surface containing an alkaline metal carbonate, the solvent is removed and then the polymeric substances containing organic groups is applied to the treated surface.

It is an object of the present invention to improve the adhesion of polymeric substances which contain organic groups or are made up of such groups, or substances containing organic groups which can be crosslinked to form polymers, to surfaces containing inorganic carbonates. Another object of the present invention is to improve the adhesion of polymeric substances containing organic groups to alkaline earth metal carbonate surfaces using readily available and comparatively non-toxic substances. Still another object of the present invention is to provide a process for improving the adhesion of polymeric substances containing organic groups to surfaces containing inorganic carbonates by applying a solution of phosphorus-containing organosilicon compound to the surface containing inorganic carbonates and removing the solvent before the polymeric substance or substance which can be crosslinked to form a polymer is applied to the treated surface containing the inorganic carbonate. A further object of the present invention is to provide a process for strengthening the adhesion of polymeric substances to surfaces containing inorganic carbonates in which the shine and smoothness of the surface containing the inorganic carbonates is not impaired and the strengthening of the adhesion of the polymeric substances to the surfaces containing inorganic carbonate is partly preserved even under the action of sulfur dioxide and water on the surfaces covered with the polymeric substance.

SUMMARY OF THE INVENTION

The foregoing objects and others which will become apparent from the following description is accomplished in accordance with this invention, generally speaking, by providing a process for strengthening the adhesion of polymeric substances which contain organic groups or are made up of such groups, or substances containing organic groups which can be crosslinked to form polymers, to surfaces containing alkaline earth metal carbonates, which comprises applying a solution containing an organic aprotic solvent and a phosphorus compound to the carbonate-containing surface, in which the phosphorus compound is a phosphorus acid or a phosphorus-containing organosilicon compound having at least one group of the formula $$RSiOP=O$$

in which R is an SiC-bonded, monovalent, substituted or unsubstituted hydrocarbon radical, removing the solvent and thereafter applying the polymeric substance to the treated surface containing the alkaline earth metal carbonate.

DESCRIPTION OF THE INVENTION

The carbonate-containing surfaces on which the adhesion of polymeric substances which contain organic groups or are made up of such groups, or substances containing organic groups which can be crosslinked to form polymers, is strengthened by means of the process of this invention are surfaces of solids, preferably those containing alkaline earth metal carbonates and especially those of natural stones consisting of carbonate or calcite, artificial stones, sands and gravels, or those of pulverulent or fibrous carbonates, such as fillers and pigments. In particular, the surfaces are those of magnesium carbonate, calcium carbonate, e.g., shell lime or marble, dolomite, calcite, strontium carbonate, barium carbonate or mixtures of at least two such carbonates, and, e.g., those of carbonate-containing stones such as natural or artificial sandy limestones, nagelfluh or tufas, concrete, lime mortar or lime plaster. The surfaces can also be those of pigments such as calcareous ocher. Examples of carbonate-containing surfaces which do not contain any alkaline earth metal carbonates are those of (semi)precious stones such as malachite, pigments such as lead carbonate, and minerals such as dialogite, smithsonite, siderite, azurite and cadmium spar, and patinas, especially those of copper and its alloys.

The carbonate-containing surfaces can be porous and/or rough, such as those of sandy limestones, or smooth and at least virtually free from pores, such as those of polished marble. The carbonate-containing surfaces can be, e.g., those of powders, as for example in the case of fillers such as ground chalk or other calcium carbonate suitable as a filler, e.g., finely divided, acicular calcium carbonate, or those of larger objects such as blocks, slabs or cladding panels. The preferred carbonate-containing surfaces are marble surfaces.

The carbonate-containing surface to be treated is preferably the surface of a substance consisting of carbonate to the extent of at least 50 percent, preferably at least 80 percent, based on its weight.

An important group of phosphorus-containing organosilicon compounds which can be used in this invention are those of the formula $$(RR^1{}_2SiO)_3P=O,$$

in which R is the same as above and the radicals represented by $R^1$ are the same or different, SiC-bonded, monovalent, substituted or unsubstituted hydrocarbon radicals, alkoxy or akoxyalkylenoxy radicals having from 1 to 4 carbon atoms per radical, radicals of the formula $$R_3SiO_{\frac{1}{2}},$$

in which R is the same as above, or radicals made up of 2 to 10 siloxane units of the formula $$RSiO_{3/2}, R_2SiO \text{ or } SiO_{4/2},$$

in which R is the same as above, or made up of a mixture of at least two such siloxane units and, if appropriate, units of the formula $$RSiO_{\frac{3}{2}},$$

in which R is again the same as above.

Another important group of phosphorus-containing organosilicone compounds which can be used in this invention are reaction products of a silane of the formula $$RSi(OR^2)_3,$$

in which R is the same as above and the radicals represented by $R^2$ are the same or different alkyl or alkoxyalkylene radicals, each having at most 4 carbon atoms per radical, or partial hydrolyzates thereof containing at most 15 silicon atoms per molecule, with orthophosphoric acid, phosphorus acid or phosphorus pentoxide or with a mixture of at least two of these phosphorus compounds, in which the reaction products contain from 0.005 to 0.33 phosphorus atom per silicon atom in these organosilicon compounds. Orthophosphoric acid is especially preferred as the phosphorus compound.

In addition to the phosphorus-containing organosilicon silicon compound used in this invention, the solutions used in this invention can contain at least one phosphorus-free organic silicon compound, if appropriate. Examples of such additional silicon compounds are in particular those of the formula $$R_aSi(OR^2)_{4-a},$$

in which R and $R^2$ are each the same as above and a is 0, 1, 2 or 3, with an average of from 0.0 to 1.8, and partial hydrolyzates thereof containing at most 15 silicon atoms per molecule.

The solution preferably contains phenyltriethoxysilane as the phosphorus-free organic silicon compound. The solutions used in this invention preferably contain from 0.5 to 33 groups of the formula $$RSiOP=O$$

per 100 silicon atoms present in these solutions. Preferably, the SiC-bonded organic radicals in the organosilicon compounds used in this invention, and hence the radicals represented by R and $R^1$ in the formulas indicated above, contain at most 18 carbon atoms per radical. Examples of hydrocarbon radicals having SiC-bonded organic radicals in the organic silicon compounds used in this invention, and hence hydrocarbon radicals represented by R and $R^1$ in the formulas indicated above, are alkyl radicals such as the methyl, ethyl, n-propyl, isopropyl and 2-ethylhexyl radicals, as well as n-octadecyl radicals; hydrocarbon radicals having at least one aliphatic double bond, such as the vinyl, allyl, ethylallyl and butadienyl radicals, as well as cyclohexenyl radicals; cycloalkyl radicals such as the cyclohexyl radical and methylcyclohexyl radicals; aryl radicals such as the phenyl radical; alkaryl radicals such as tolyl radicals; and aralkyl radicals such as the benzyl radical.

Examples of substituted hydrocarbon radicals having SiC-bonded organic radicals in the organic silicon compounds used in this invention, and hence represented by radicals R and $R^1$ in the formulas indicated above, are halogenated hydrocarbon radicals such as alkyl radicals substituted by fluorine atoms, e.g., the 3,3,3-trifluoropropyl radical, as well as chlorophenyl radicals, acyloxy alkyl radicals such as the 3-methacryloxypropyl radical, and cyanoalkyl radicals such as the beta-cyanoethyl radical.

Examples of alkyl radicals represented by $R^2$ are the methyl, ethyl, n-propyl, isopropyl, n-butyl, sec-butyl and tert-butyl radicals. The most important example of an alkoxyalkylene radical represented by $R^2$ is the beta-methoxyethylene radical. The preparation of compounds of the formula $$(RR^1{}_2SiO)_3P=O,$$

in which R and $R^1$ are the same as above, is described, e.g., in British Patent No. 16 04 360 (J. S. Razzano et al, General Electric Company).

The preparation of reaction products of silanes of the formula $$RSi(OR^2)_3,$$

in which R and $R^2$ are the same as above, or partial hydrolyzates thereof, with orthophosphoric acid, phosphorous acid, phosphorus pentoxide or mixtures thereof is described, e.g., in U.S. Pat. No. 3,767,432 (I. M. Thomas, Owens-Illinois, Inc.)

Tris(trimethylsiloxy) phosphate is especially preferred as the organosilicon compound of the formula $$(RR^1{}_2SiO)_3P=O.$$

Reaction products of phenyltriethoxysilane with orthophosphoric acid are especially preferred as reaction products of silanes of the formula $$RSi(OR^2)_3$$

with orthophosphoric acid.

Specific examples of phosphorus-free organic silicon compounds which may be present in the solutions used according to this invention, in addition to the phosphorus-containing organosilicon compound, are methyltrimethoxysilane, phenyltriethoxysilane, tetramethoxysilane, tetraethoxysilane and 3-methacryloxypropyltrimethoxysilane.

Organic aprotic solvents, preferred polar organic aprotic solvents can be used. Of these polar solvents, acetic acid esters of alkanols having from 1 to 4 carbon atoms per molecule, in particular ethyl acetate, are especially preferred. Further examples of polar organic aprotic solvents which can be used in the process of this invention are chlorohydrocarbons such as methylene chloride, 1,2-dichloroethane, 1,1,1-trichloroethane, 1,1,2-trichloroethylene, perchloroethylene and chlorobenzene; ketones such as methyl ethyl ketone and cyclohexanone; and ethers such as di-sec-butyl ether.

One type of organic solvent may be used; however, it is also possible to use mixtures of at least two different types of such solvents.

The solutions used in this invention preferably contain from 0.001 to 0.15, and more preferably from 0.003 to 0.05 and most preferably from 0.005 to 0.03 gram atom of phosphorus, in the phosphorus-containing organosilicon compounds used according to this invention, per 100 g of their total weight.

The carbonate-containing surfaces are preferably free from greasy substances and other contaminants, such as dust, before the solutions of this invention are applied.

Before the solutions of this invention are applied, the carbonate-containing surfaces can be dry or they can be moist due to the presence of adsorbed water or solvent. They are preferably somewhat moist due to the presence of adsorbed water.

The application of the solutions of this invention to the carbonate-containing surfaces which are to be treated therewith can be carried out in any manner suitable for the application of solutions in an aprotic organic solvent to surfaces of normally solid substances, e.g., by spraying, pouring, spreading, rolling or dipping, or by mixing with carbonate-containing powder. The removal of solvent from a carbonate-containing surface treated with the solution of this invention, before said surface is brought into contact with a polymeric substance or a substance which can be cross-linked to form a polymer, whose adhesion to this surface is to be strengthened, can be carried out by allowing the solvent to volatilize or by causing it to vaporize.

The polymeric substances which contain organic groups or are made up of such groups, and with which carbonate-containing surfaces pretreated with a solution of this invention are brought into contact after the solvent has been removed from these surfaces, can be any polymeric substances, containing organic groups or consisting of such groups, with which it has also been possible heretofore to coat or impregnate carbonate-containing surfaces, or in which it has also been possible heretofore for carbonates to be present as fillers or reinforcing agents. Another possibility is that the polymeric substances may be formed from low-molecular substances, such as methyltriethoxysilane, after contact with the carbonate-containing surface.

Preferred examples of polymeric substances which contain organic groups or are made up of such groups, and with which carbonate-containing surfaces pretreated with the solution of this invention can be brought into contact after the solvent has been removed from these surfaces, are those which are at least partly made up of units derived from alkyl esters or amides or acrylic acid or methacrylic acid, and if appropriate, units derived from acryloxyalkysilanes, especially 3-acryloxypropylsilanes such as 3-acryloxypropyltrimethoxysilane, and/or methacryloxyalkylsilanes, especially 3-methacryloxypropylsilanes such as 3-methacryloxypropyltrimethoxysilane.

Additional examples of polymeric substances which are made up of organic groups, and with which carbonate-containing surfaces pretreated with the solution of this invention can be brought into contact after the solvent has been removed from these surfaces, or of low-molecular substances from which such polymers can form on these surfaces, are organoalkoxysilanes other than the methyltriethoxysilane already mentioned, e.g., phenyltriethoxysilane, or partial hydrolyzates thereof, or thermoplastic or thermosetting organopolysiloxanes, including organopolysiloxane elastomers, epoxy resins, polyesters and polyamides.

One layer of polymeric substance can be applied to the carbonate-containing surfaces pretreated according to this invention or can be produced on these surfaces. It is also possible, however, for at least two layers of the same or different polymeric substances to be applied to the carbonate-containing surfaces pretreated according to this invention or to be produced on these surfaces.

The polymeric substances which are made up of organic groups or contain such groups, or the substances which can be crosslinked to form polymers, can be brought into contact with carbonate-containing surfaces pretreated with the solution of this invention, after the solvent has been removed from these surfaces, in any manner in which it has also been possible heretofore for polymeric substances of the type described above to be brought into contact with surfaces, e.g., by mixing fillers consisting of carbonate or containing carbonate, and pretreated according to this invention, with such polymeric substances, or by applying such polymeric substances to the surfaces to be coated, e.g., by spreading, spraying, pouring, rolling or dipping. In this process, the polymeric substances can be used in an undiluted form, provided their viscosity allows, or in the form of solutions or dispersions.

The process of this invention is especially suitable for strengthening the adhesion of building protective agents, for example, stone consolidators, and preferably those based on silicic acid esters, in particular tetramethylsilicate, tetraethylsilicate (tetraethoxysilane) and partial hydrolyzates thereof, to carbonate-containing artificial or natural stone. It is also suitable for strengthening the adhesion of the binder in the production of artificial stone containing inorganic carbonates. For these uses, it is often advantageous to apply a mixture of silicic acid esters and/or partial hydrolyzates thereof with silicone resins to the surfaces pretreated according to this invention. The building protective agents or binders based on silicic acid ester are preferably applied to the pretreated surfaces in the form of solutions or dispersions in solvents, especially organic solvents. Solvents which can be used for this purpose are alcohols, especially methanol, ethanol, n-propanol, i-propanol, n-butanol, sec-butanol, tert-butanol, pentanols or hexanols; aromatics, especially toluene and m-, o- and p-xylene; ketones, especially acetone, methyl ethyl ketone, methyl isobutyl ketone and methyl n-propyl or i-propyl ketone; esters, especially methyl acetate, ethyl acetate, n-propyl acetate, i-propyl acetate and n-, sec- and tert-butyl acetate; and mixtures of the above-mentioned solvents. Building protective agents which can be used, and their use, is further described in U.S. Pat. No. 3,955,988 and Canadian Patent No. 1 128 685 (both to M. Roth et al, Wacker-Chemie GmbH).

The process of this invention can, of course, also be carried out on artificial or natural stone surfaces which do not contain carbonates.

In the following examples, all parts and percentages are by weight, unless otherwise specified.

EXAMPLES 1 to 5

In each of the examples in Table I below, 1 g of one of the following solutions:

5 percent of tris(trimethylsiloxy) phosphate, 5 percent of phenyltriethoxysilane and 90 percent of ethyl acetate (Examples 1 and 5), 2.5 percent of tris(trimethylsiloxy) phosphate, 5 percent of phenyltriethoxysilane and 92.5 percent of ethyl acetate (Example 2), 10 percent of tris(trimethylsiloxy)phosphate, 5 percent of phenyltriethoxysilane and 85 percent of ethyl acetate (Example 3), and 5 percent of tris(trimethylsiloxy) phosphate, 10 percent of phenyltriethoxysilane and 85 percent of ethyl acetate (Example 4), is applied to 100 $cm^2$ surfaces of polished slabs of the type of stone indicated in Table I, which have been rinsed with water freed from foreign ions and have been allowed to stand for one hour at room temperature so that they are still moist when the solution is applied.

The slabs are then allowed to stand for 4 hours at room temperature in order to remove the solvent by volatilization. A commercially available lacquer based on a copolymer of methyl methacrylate and ethyl methacrylate ("Paraloid B 72" from Rohm & Haas Co., Philadelphia, Pa., U.S.A., the name "Paraloid" being a registered trademark) is then applied to the pretreated surfaces containing alkaline earth metal carbonate. The strength of the adhesion of the coating to the calcium carbonate surface is evaluated by means of the cross-cut test according to DIN (Deutsche Industrie Norm) 53 151 of May 1981. In this test, the strength of the adhesion of the coating is greatest for a characteristic cross-cut value of 0; the higher the characteristic cross-cut value, the weaker the adhesion of the coating to the substrate.

TABLE I

| Example or Comparative Example | Type of Stone | Origin | Characteristic cross-cut Value Gt (1) | (2) | (3) |
|---|---|---|---|---|---|
| a(4) | Marble | Jura | 2-3 | 3 | (+++) |
| 1 | Marble | Jura | 0 | 0 | 0 |
| 2 | Marble | Jura | 0 | 0 | 0 |
| 3 | Marble | Jura | 0 | 0 | (+) |
| 4 | Marble | Jura | 0 | 0 | 0 |
| b(4) | Shell lime | Jura | 0-1 | 1 | (+++) |
| 5 | Shell lime | Jura | 0 | 0-1 | 0-1 |

(1) After the lacquer has dried.
(2) After storage for 16 hours at room temperature in air saturated with water and containing 20 g of sulfur dioxide per 50 l at 20° C. and 1000 hPa (abs.).
(3) After storage for 16 hours under water containing 6 percent sulfur dioxide.
(4) Comparative tests, i.e., without pretreatment of the marble.
(+) Some of the lacquer separates from the substrate without the marble or shell lime being attacked.
(++) The surface of the marble or shell lime is slightly attacked.
(+++) Strongly cauterized marble surface.

EXAMPLES 6 to 9

In each of the numbered Examples in Table II below, 1 g of one of the following solutions:

5 percent of tris(trimethylsiloxy) phosphate, 5 percent of phenyltriethoxysilane and 90 percent of ethyl acetate (Examples 6, 8 and 9) and 10 percent of a phenyltriethoxysilane/orthophosphoric acid reaction product and 90 percent of ethyl acetate (Example 7), in which the phenyltriethoxysilane/orthophosphoric acid reaction product is prepared by refluxing a mixture of 88 parts of phenyltriethoxysilane, 12 parts of anhydrous orthophosphoric acid and 500 parts of toluene until the amount of ethanol in a Dean-Stark trap remained constant, which took about 8 hours, distilling off the toluene and dissolving the residue in ethyl acetate, is applied to 100 cm2 surfaces of polished slabs of the type of stone indicated in Table II, which have been rinsed with water freed from foreign ions and allowed to stand for one hour at room temperature so that they are still moist when the solution is applied.

The slabs are then allowed to stand for 4 hours at room temperature in order to remove the solvent by volatilization. A commercially available lacquer based on a copolymer of 86 percent of methyl methacrylate, 12 percent of 2-hydroxyethyl acrylate and 2 percent of 3-methacryloxypropyltrimethoxysilane is then applied to the pretreated surfaces containing alkaline earth metal carbonate. The strength of the adhesion of the coating to the calcium carbonate surface is evaluated as described in Example 1.

TABLE II

| Example or Comparative Example | Type of Stone | Origin | Characteristic cross-cut Value Gt (1) | (2) | (3) |
|---|---|---|---|---|---|
| c(4) | Marble | Botticino | 1-2 | 2 | (+++) |
| 6 | Marble | Botticino | 1 | 1 | 1 |
| 7 | Marble | Botticino | 0 | 0 | (+) |
| d(4) | Shell lime | Jura | 1-2 | 1-2 | (+++) |
| 8 | Shell lime | Jura | 0-1 | 0-1 | 0-1 |
| e(4) | Marble | Carrara | 2-3 | 4 | (++) |
| 9 | Marble | Carrara | 2-3 | 2-3 | 2-3 |

(1) to (4) Same as in Table I.
(+) to (+++) Same as in Table I.

EXAMPLES 10 to 12

In the following Examples, pulverulent chalk coated according to this invention (Examples (10) to (12)] or commercially available, untreated chalk or chalk treated with stearate [Comparative Examples (f), (g) and (h)] were used as fillers in plastics.

Fillers (1) Comparative Examples (g) and (h): untreated chalk (Omyalite 90; mean particle size 1 μm; Omya GmbH, 5000 Cologne).

(2) Comparative Example (f): chalk coated with stearate (Omyalite 95T; mean particle size 1 μm; Omya GmbH, 5000 Cologne).

(3) Examples (10) and (12): chalk (Omyalite 90) coated with $OP(OSi(CH_3)_3)_3$.

(4) Example 11: chalk (Omyalite 90) coated with $OP((OSi(CH_3)_3)_3$ and phenyltrimethoxysilane.

Plastic formulation (A)

EXAMPLES 10 and 11, COMPARATIVE EXAMPLES (f) and (g)

100 parts by weight of ethylene/vinyl acetate copolymer. (Levapren 450 from Bayer, AG, D-5090 Leverkusen)

40 parts by weight of filler as indicated above 2 parts by weight of triallyl cyanurate 4 parts by weight of a 40 percent by weight solution of bis(t-butylperoxyisopropyl)benzene (Perkadox 14/40 from Akzo-Chemie, D-5160 Duren)

1 part by weight of stearic acid

Plastic formulation (B)

EXAMPLE 12, COMPARATIVE EXAMPLE (h)

45 parts by weight of a polydimethylsiloxane containing terminal hydroxyl groups, with a viscosity of 80 mm2/s at 25° (FD 80 from Wacker-Chemie GmbH, D-8000 Munich)

60 parts by weight of filler as indicated above 7 parts by weight of highly dispersed silicic acid with a BET specific surface area of 150 m2/g 30 parts by weight of silicone oil (AK 100 from Wacker-Chemie GmbH, D-8000 Munich)

7.5 parts by weight of oxime-based crosslinking agent (crosslinking agent BO 30 from Wacker-Chemie GmbH)

0.15 part by weight of catalyst (catalyst 41 from Wacker-Chemie GmbH, D-8000 Munich)

TABLE III

| | | Plastic mixture (A) | | | | | |
|---|---|---|---|---|---|---|---|
| | | Tear resistance in N/mm² | | Elongation at break in % | | Tear propagation strength in N/mm | Compression set in % |
| Example | Filler | * | ** | * | ** | * | * |
| (f) | (2) | 6.55 | 0.99 | 420 | 120 | 6.7 | 13.2 |
| (g) | (1) | 8.68 | 1.20 | 428 | 150 | 7.6 | 13.2 |
| (10) | (3) | 8.17 | 1.65 | 414 | 138 | 8.2 | 11.5 |
| (11) | (4) | 8.48 | 1.67 | 430 | 136 | 7.6 | 11.9 |

\* Measured after storage at room temperature.
\*\* Measured after storage for six days at 140° C.

TABLE IV

| | | Plastic mixture (B); % change in the physical properties after storage for four weeks at 70° C. in water vapor. | | | |
|---|---|---|---|---|---|
| Example | Filler | % change in Shore A hardness | Tear resistance | Elongation at break | Modulus at 100% elongation |
| (h) | (1) | −42.9 | −54.8 | +9 | −64.7 |
| (12) | (3) | −26.9 | −50 | +26 | −51.9 |

EXAMPLE 13, COMPARATIVE EXAMPLES (i) and (j)

Preparation of Artificial Stone

Mixture (A): This is a mixture consisting of 2 parts by weight of dibutyltin dilaurate and 100 parts by weight of a partial hydrolyzate of tetraethoxysilane containing 34 percent by weight of $SiO_2$.

Mixture (B): This is a 2 percent by weight solution of a mixture of 9 parts by weight of phenyltriethoxysilane and 1 part by weight of trimethylsily phosphate in acetone.

Mixture (C): This is a 2 percent by weight solution of vinyltriethoxysilane in acetone.

Preparation of the moldings: One hundred parts by weight of a calcite with a particle size distribution of from 0.1 to 0.5 mm, which may or may not have been pretreated as described below, were mixed with 20 parts by weight of mixture (A) and filled into an annular mold with a diameter of 75 mm and a height of 10 mm. After 4 days, the molding prepared in this way was impregnated with an additional 10 parts by weight of mixture (A) and finally, after another 14 days, with 5 parts by weight of mixture (A). Comparative Example (i): non-pretreated calcite.

EXAMPLE 13

The calcite was dried for 24 h at 70° C. and then suspended in mixture (B), the excess mixture (B) was removed by decantation and the calcite was dried at room temperature.

COMPARATIVE EXAMPLE (j)

Example 13 was repeated, except that mixture (C) was used instead of mixture (B).

The adhesive strengths for each of eight identically treated moldings were measured on a Herion Fluidtronik ® instrument (manufacturer: Herion Werke KG, D-7012 Fellbach) with plungers of 50 mm diameter and these measurements were averaged. The following results were obtained:

TABLE V

Example Adhesive strength [N/mm²]

TABLE V-continued

Comparative Example (i) 0.019
Comparative Example (j) 0.021
Example (13) 0.038

What is claimed is:

1. A process for strengthening the adhesion of a polymeric substance which contains organic groups or are made up of such groups, or a substance containing organic groups which can be crosslinked to form a polymer, to a surface containing an inorganic carbonate, which comprises applying, a solution containing an organic aprotic solvent and a phsophorus compound to a surface containing an inorganic carbonate, in which the phosphorus compound is selected from the group consisting of phosphorus acid and a phosphorus-containing organosilicon compound having at least one group of the formula $$RSiOP=O,$$

in which R is an SiC-bonded radical selected from the group consisting of a monovalent unsubstituted hydrocarbon radical and a monovalent substituted hydrocarbon radical, removing the solvent and thereafter applying the polymeric substance to the treated surface containing the inorganic carbonate, said phosphorus-containing organosilicon compound is selected from the group consisting of (1)

$$(RR^1{}_2SiO)_3P=O,$$

in which R is the same as above, $R^1$ is a radical selected from the group consisting of an SiC-bonded monovalent unsubstituted hydrocarbon radical, a monovalent substituted hydrocarbon radical, an alkoxy radical, an alkoxyalkylenoxy radical having from 1 to 4 carbon atoms per radical, radicals of the formula $$R_3SiO_{\frac{1}{2}},$$

in which R is the same as above, radicals having from 2 to 10 siloxane units of the formula $$RSiO_{3/2}, R_2SiO \text{ or } SiO_{4/2},$$

in which R is the same as above and mixtures of at least 2 such siloxane units and (2) a compound obtained from the reaction of a silane of the formula $$RSi(OR^2)_3,$$

in which R is the same as above, $R^2$ is selected from the group consisting of an alkyl radical having up to 4 carbon atoms per radical, an alkoxyalkylene radical having up to 4 carbon atoms per radical and partial hydrolyzates thereof containing at most 15 silicon atoms per molecule, with a phosphorus compound selected from the group consisting of orthophosphoric acid, phosphorus acid, phosphorus pentoxide and mixtures thereof, in which the reaction product contains from 0.005 to 0.33 phosphorus atom per silicon atom in the organosilicon compound.

2. The process of claim 1, wherein the phosphorus-containing organosilicon compound has the formula $$(RR^1{}_2SiO)_3P=O,$$

in which R is an SiC-bonded radical selected from the group consisting of a monovalent unsubstituted hydrocarbon radical and a monovalent substituted hydrocarbon radical, $R^1$ is a radical selected from the group consisting of an SiC-bonded monovalent unsubstituted hydrocarbon radical, a monovalent substituted hydrocarbon radical, an alkoxy radical, an alkoxyalkylenoxy radical having from 1 to 4 carbon atoms per radical, radicals of the formula $R_3SiO_{\frac{1}{2}}$, in which R is the same as above, radicals having from 2 to 10 siloxane units of the formula $RSiO_{3/2}$, $R_2SiO$ or $SiO_{4/2}$, in which R is the same as above and mixtures of at least 2 such siloxane units.

3. The process of claim 1, wherein the phosphorus-containing organosilicon compound has the formula $(RR^1{}_2SiO)_3P=O$, in which R is an SiC-bonded radical selected from the group consisting of a monovalent unsubstituted hydrocarbon radical and a monovalent substituted hydrocarbon radical, $R^1$ is a radical selected from the group consisting of an SiC-bonded monovalent unsubstituted hydrocarbon radical, a monovalent substituted hydrocarbon radical, an alkoxy radical, an alkoxyalkylenoxy radical having from 1 to 4 carbon atoms per radical, radicals of the formula $R_3SiO_{\frac{1}{2}}$, in which R is the same as above, radicals having from 2 to 10 siloxane units of the formula $RSiO_{3/2}$, $R_2SiO$ or $SiO_{4/2}$, in which R is the same as above, mixtures of at least 2 such siloxane units and units of the formula $R_3SiO_{\frac{1}{2}}$, in which R is the same as above.

4. The process of claim 1, wherein the phosphorus-containing organosilicon compound is obtained from the reaction of a silane of the formula $RSi(OR^2)_3$, in which R is an SiC-bonded radical selected from the group consisting of a monovalent unsubstituted hydrocarbon radical and a monovalent substituted hydrocarbon radical, $R^2$ is selected from the group consisting of an alkyl radical having at most 4 carbon atoms per radical, and alkoxyalkylene radical having at most 4 carbon atoms per radical and partial hydrolyzates thereof containing at most 15 silicon atoms per molecule, with orthophosphoric acid, in which the reaction product contains from 0.005 to 0.33 phosphorus atom per silicon atom in the organosilicon compound.

5. The process of claim 2, wherein the phosphorus-containing organosilicon is tris(trimethylsiloxy) phosphate.

6. The process of claim 3, wherein the phosphorus-containing organosilicon compound is tris(trimethylsiloxy) phosphate.

7. The process of claim 1, wherein the solution contains at least one phosphorus-free organic silicon compound in addition to the phosphorus-containing organosilicon compound.

8. The process of claim 2, wherein the solution contains at least one phosphorus-free organic silicon compound in addition to the phosphorus-containing organosilicon compound.

9. The process of claim 3, wherein the solution contains at least one phosphorus-free organic silicon compound in addition to the phosphorus-containing organosilicon compound.

10. The process of claim 4, wherein the solution contains at least one phosphorus-free organic silicon compound in addition to the phosphorus-containing organosilicon compound.

11. The process of claim 5, wherein the solution contains at least one phosphorus-free organic silicon compound in addition to the phosphorus-containing organosilicon compound.

12. The process of claim 6, wherein the solution contains at least one phosphorus-free organic silicon compound in addition to the phosphorus-containing organosilicon compound.

13. The process of claim 7, wherein the phosphorus-free organic silicon compound is phenyltriethoxysilane.

14. The process of claim 8, wherein the phosphorus-free organic silicon compound is phenyltriethoxysilane.

15. The process of claim 9, wherein the phosphorus-free organic silicon compound is phenyltriethoxysilane.

16. The process of claim 10, wherein the phosphorus-free organic silicon compound is phenyltriethoxysilane.

17. The process of claim 11, wherein the phosphorus-free organic silicon compound is phenyltriethoxysilane.

18. The process of claim 12, wherein the phosphorus-free organic silicon compound is phenyltriethoxysilane.

19. The process of claim 1, wherein the surface containing inorganic carbonate is selected from the group consisting of natural stones containing carbonate, calcite, artificial stones, sand, gravel, pulverulent inorganic carbonate and fibrous inorganic carbonate.

20. The process of claim 2, wherein the surface containing inorganic carbonate is selected from the group consisting of natural stones containing carbonate, calcite, artificial stones, sand, gravel, pulverulent inorganic carbonate and fibrous inorganic carbonate.

21. The process of claim 3, wherein the surface containing inorganic carbonate is selected from the group consisting of natural stones containing carbonate, calcite, artificial stones, sand, gravel, pulverulent inorganic carbonate and fibrous inorganic carbonate.

22. The process of claim 1, wherein the inorganic carbonate containing surface consists of at least 50 percent alkaline earth metal carbonate.

23. The process of claim 2, wherein the inorganic carbonate containing surface consists of at least 50 percent by weight of an alkaline earth metal carbonate.

24. The process of claim 3, wherein the inorganic carbonate containing surface consists of at least 50 percent by weight of an alkaline earth metal carbonate.

25. The process of claim 1, wherein the polymeric substance which contains organic groups or are made up of such groups, or the substance containing organic groups which can be crosslinked to form a polymer, is selected from the group consisting of tetramethyl silicate, tetraethyl silicate, partial hydrolyzates thereof, organosilanes which can be crosslinked to form polymers and polyorganosiloxanes.

26. The process of claim 2, wherein the polymeric substance which contains organic groups or are made up of such groups, or the substance containing organic groups which can be crosslinked to form a polymer, is selected from the group consisting of tetramethyl silicate, tetraethyl silicate, partial hydrolyzates thereof, organosilanes which can be crosslinked to form polymers and polyorganosiloxanes.

27. The process of claim 3, wherein the polymeric substance which contains organic groups or are made up of such groups, or the substance containing organic groups which can be crosslinked to form a polymer, is selected from the group consisting of tetramethyl silicate, tetraethyl silicate, partial hydrolyzates thereof, organosilanes which can be crosslinked to form polymers and polyorganosiloxanes.

28. A process of consolidating a material selected from the group consisting of natural stone and artificial stone containing an inorganic carbonate, which comprises applying a solution containing an organic aprotic solvent and a phosphorus compound to the substance containing an inorganic carbonate, in which the phosphorus compound is selected from the group consisting of a phosphorus acid and a phosphorus-containing organosilicon compound having at least one group of the formula RSiOP=O, in which R is an SiC-bonded radical selected from the group consisting of a monovalent unsubstituted hydrocarbon radical and a monovalent substituted hydrocarbon radical, removing the solvent and thereafter applying a polymeric substance which contains organic groups or a substance containing organic groups which can be crosslinked to form a polymer to the treated material containing an inorganic carbonate.

* * * * *